US007405767B2

United States Patent
Li

(10) Patent No.: US 7,405,767 B2
(45) Date of Patent: Jul. 29, 2008

(54) VIDEO IMAGE CONVERSION METHOD FOR INTERLACED IMAGE TO PROGRESSIVE IMAGE AND SYSTEM THEREOF

(75) Inventor: Chien-Hsin Li, Hsinhua (TW)

(73) Assignee: Himax Technologies, Inc., Tainan (TW)

( * ) Notice: Subject to any disclaimer, the term of this patent is extended or adjusted under 35 U.S.C. 154(b) by 565 days.

(21) Appl. No.: 11/174,109

(22) Filed: Jul. 1, 2005

(65) Prior Publication Data

US 2007/0002170 A1    Jan. 4, 2007

(51) Int. Cl.
  *H04N 11/20*  (2006.01)
(52) U.S. Cl. ...................................... 348/448
(58) Field of Classification Search ................ 348/448, 348/441, 452, 458, 459
See application file for complete search history.

(56) References Cited

U.S. PATENT DOCUMENTS 6,229,578 B1 * 5/2001 Acharya et al. ............. 348/607
6,614,484 B1 * 9/2003 Lim et al. .................... 348/448
6,707,937 B1 * 3/2004 Sobel et al. .................. 382/162
6,731,342 B2 * 5/2004 Shin et al. .................... 348/452
7,245,326 B2 * 7/2007 Orlick ......................... 348/448

* cited by examiner

*Primary Examiner*—Paulos M Natnael
(74) *Attorney, Agent, or Firm*—J.C. Patents

(57) ABSTRACT

A video image conversion method is for converting interlaced image into progressive image. The deinterlacing method for the video system is for converting the interlaced image into the progressive image. The method performs an interpolation algorithm based on the pixel value of a reference field. An inter-field estimation on the pixel values is performed by referring to a predetermined value to calculate difference value between specific vicinity pixel value and predetermined value, to obtain a set of pixel values, corresponding to the minimum value of summation of a set of pixel difference values. The pixel value corresponding to the auxiliary field is interpolated. The reference field and the auxiliary filed are also referred as the odd field and the even field, where neither the interlacing order nor the respective correspondence is constrained. The method further detects a still motion, such that the flickering is effectively eliminated in another interpolation mode.

7 Claims, 3 Drawing Sheets

$$\text{MIN}[(|P_{a-3}-R|+|P_{b+3}-R|),(|P_{a-2}-R|+|P_{b+2}-R|),(|P_{a-1}-R|+|P_{b+1}-R|),$$
$$(|P_a-R|+|P_b-R|),(|P_{a+1}-R|+|P_{b-1}-R|),(|P_{a+2}-R|+|P_{b-2}-R|),$$
$$(|P_{a+3}-R|+|P_{b-3}-R|)]$$

VIDEO IMAGE CONVERSION METHOD FOR INTERLACED IMAGE TO PROGRESSIVE IMAGE AND SYSTEM THEREOF

BACKGROUND OF THE INVENTION

1. Field of the Invention

The present invention relates to a video system conversion method, and more particularly, to a video system conversion method for converting an interlaced image into a progressive image by applying an interpolation algorithm.

2. Description of the Related Art

Figure 1:
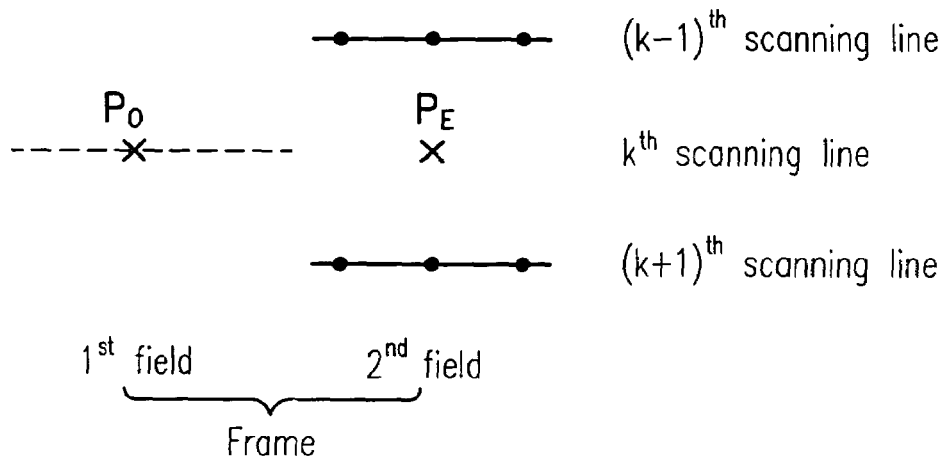

In the major video format of the conventional technique, the video frame is divided into an odd filed and an even filed, wherein the image scanning lines interleaved with each other are included therein. The odd field and the even field are independently scanned with a scanning period of every $\frac{1}{60}$ second and both fields are interleaved with each other to form a frame. Referring to FIG. 1, the position $P_O$ of an object in an odd field (i.e. the $1^{st}$ field of FIG. 1) on the $k^{th}$ scanning line is scanned at a specific time point. After a scanning period is passed, the same object is corresponded to the position $P_E$ of an even field (i.e. the $2^{nd}$ field of FIG. 1). However, meanwhile the scanning lines only include the $(k-1)^{th}$ scanning line and the $(k+1)^{th}$ scanning line, but the $k^{th}$ scanning line is not included. Therefore, if it is to represent a pixel corresponding to the odd field on the even field, e.g. a pixel on the position $P_E$ of the $k^{th}$ scanning line, an estimation value is obtained by applying a specific interpolation algorithm with referring to the pixel values on the even field such as the $(k-1)^{th}$ scanning line and the $(k+1)^{th}$ scanning line, such that the interlaced image is converted to the progressive image. Such method is also known as the deinterlacing method, which is an important digital video technique. In order to eliminate the inter-field flickering due to the motion gap, a conventional technique performing an inter-field interpolation for data on the edge of a motion object in image is roughly described hereinafter.

Figure 2:
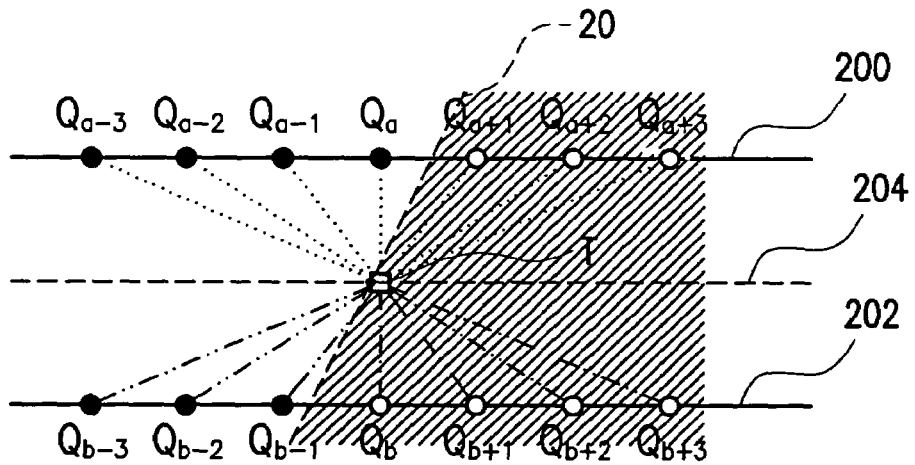

The conventional method performs an interpolation operation on the pixel value of a set of neighboring pixels, so as to estimate a pixel value of a target pixel on the scanning lines in another field. The interpolation algorithm is especially effective for estimating the pixel value in a filed when detecting the data having edges in image. As shown in FIG. 2, in the conventional algorithm, it is to obtain the corresponding difference values of the pixel values $Q_{a-3}$, $Q_{a-2}$, $Q_{a-1}$, $Q_a$, $Q_{a+1}$, $Q_{a+2}$, $Q_{a+3}$ and $Q_{b-3}$, $Q_{b-2}$, $Q_{b-1}$, $Q_b$, $Q_{b+1}$, $Q_{b+2}$, $P_{b+3}$, respectively, which are the pixel values of two sets of pixels on the scanning lines 200 and 202 above/below the target pixel (its value is T) on the edge or most close to the edge. Then, a pixel mean of the set of pixels having the minimum difference value is used as a target pixel value, namely the pixel value T on the interpolation line 204. In other words, it is to obtain the minimum value of $|Q_{a-3}-Q_{b+3}|$, $|Q_{a-2}-Q_{b+2}|$, $|Q_{a-1}-Q_{b+1}|$, $|Q_a-Q_b|$, $|Q_{a+1}-Q_{b-1}|$, $|Q_{a+2}-Q_{b-2}|$, $|Q_{a+3}-Q_{b-3}|$, and further to obtain a mean $(Q_x+Q_y)/2$ of a set $(Q_x, Q_y)$, in which the minimum value is located on, as the T value. The shortcoming of such interpolation algorithm is if the variance of the reference pixel value neighboring to the target pixel is too big and is corresponded to a set having the minimum value, the mean is departed from the pixel value too far, wherein the mean makes the edge 20 of the image more smoothly. For example, it is assumed that the pixel values of $Q_a$ and $Q_b$ are 100, 101 respectively, and both the pixel values of $Q_{a+3}$ and $Q_{b-3}$ are 150, since the difference value is 0 and its value is less than all other sets, the minimum difference value is corresponded to $(Q_{a+3}, Q_{b-3})$ set. Accordingly, T value is assigned as $(150+150)/2=150$ rather than the pixel value of $Q_a$ or $Q_b$ that is closer in practical.

In order to eliminate the shortcoming of the conventional technique mentioned above, the present invention discloses an improved interpolation algorithm for avoiding the abnormal departure of the pixel value of the target pixel due to the special case mentioned above.

SUMMARY OF THE INVENTION

Therefore, it is an object of the present invention to provide a video image conversion method for converting an interlaced image into a high quality progressive image by applying an interpolation algorithm.

It is another object of the present invention to provide another video image conversion method, in which a still motion is determined first. and the flickering is eliminated by applying the interpolation algorithm.

The present invention provides an interpolation algorithm. The algorithm assigns a predetermined pixel value to a target pixel on the field to be interpolated. The predetermined pixel value is assigned as an arithmetic mean of two closet pixel values on the scanning lines above/below the pixel closet to the target pixel in the reference field. First, the pixel value of a plurality of pixel sets (e.g. three sets) is obtained from two sides corresponding to the target pixel on the scanning line in the reference field. Then, the difference value is obtained respectively by comparing it with the pixel value, and a summation of each set of different values is obtained, respectively. Finally, a set of pixel values with a minimum summation is obtained as a preferred set of reference pixels, and an arithmetic mean of the set of pixel values is obtained as the interpolated target pixel value after applying the interpolation algorithm of the present invention.

In accordance with the present invention, the position of the pixel with edge data in image is detected when the interpolation algorithm mentioned above is applied, that is the object edge is displayed on the image. When the edge data is being detected in every period, the edge position of the object in current filed is compared with the edge position in the previous field. If the edge positions of the object are varied in a small range for a plurality of contiguous fields, e.g. it is not greater than three pixels, it is determined that the object is immobile (still). Meanwhile, if the interpolation algorithm mentioned above is continuously applied on each field, the pixel value of the target pixel is slightly varied due to the field is changed. However, for the viewer, the object is in a still state and should not be slightly varied with a frequency of $\frac{1}{60}$ second. In other words, the object edge in image is flickering for the viewer. Accordingly, when the still mode is detected in the present invention, the operation mode is switched to another interpolated mode. In such interpolated mode, once the still mode is detected, the pixel values of the target pixel on the edge in both the previous field and the next field are extracted first, then an arithmetic mean is obtained and the pixel value of the target pixel is fixed on the mean value. Meanwhile, the operation of detecting the position of pixel with edge data in image is continuously performed, if the variance of the object edge in image during switching the filed exceeds a specific pixel number, e.g. three pixels as mentioned above or other number having more meanings for determining, the process is back to the interpolation algorithm of the motion mode in order to estimate the pixel value to be interpolated.

In summary, the present invention applies the corresponding interpolation algorithm to different image modes, such that the edge smoothness of the motion object in high motion mode is enhanced, and the flickering in the still mode is further eliminated.

BRIEF DESCRIPTION DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 1 schematically shows a conventional frame, and the frame comprises a $1^{st}$ field and a $2^{nd}$ filed that are scanned with a gap of 1/60 second.

FIG. 2 schematically shows a diagram illustrating the calculation of the interpolated pixel value in the prior art.

Figure 3:
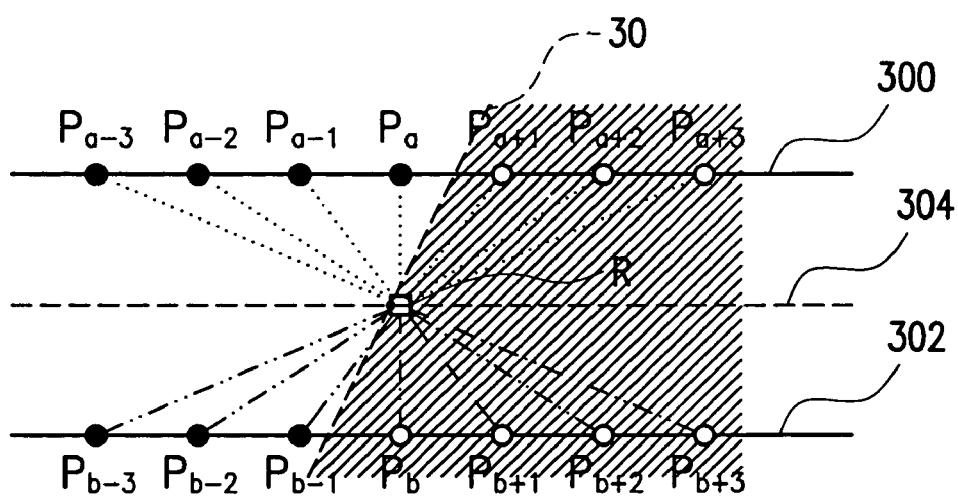

FIG. 3 schematically shows a diagram illustrating the calculation of the interpolated pixel value according to a preferred embodiment of the present invention.

Figure 4:
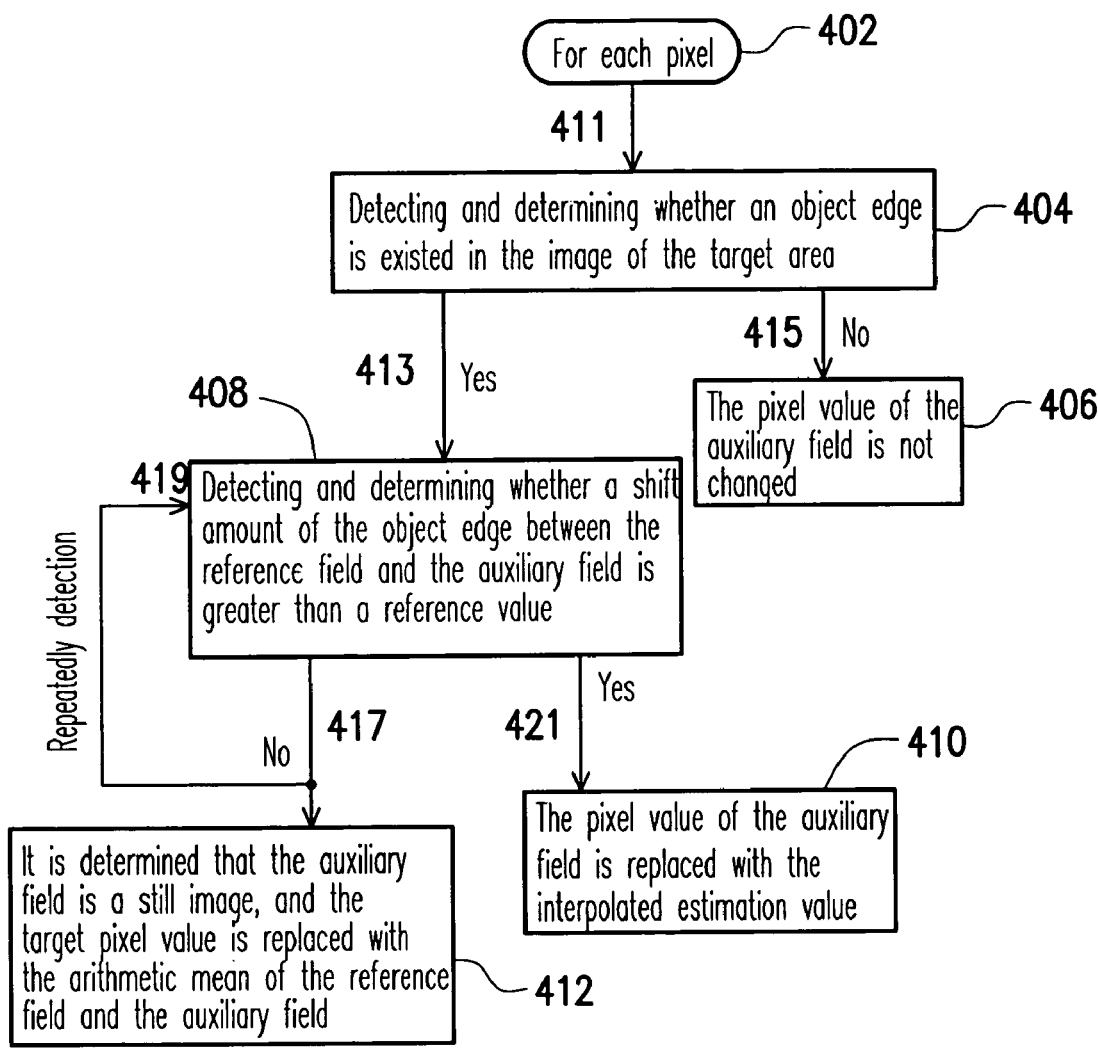

FIG. 4 schematically shows a flow chart illustrating a conversion system for converting an interlaced image into a progressive image according to a preferred embodiment of the present invention.

DESCRIPTION PREFERRED EMBODIMENTS

FIG. 3 schematically shows an interpolated algorithm according to a preferred embodiment of the present invention. In the present preferred embodiment, two fields are used as the reference field, and the pixel on the $1^{st}$ field is the pixel to be interpolated. However, the order of the $1^{st}$ field and the $2^{nd}$ filed is not necessarily limited by it. As shown in FIG. 3, the scanning line 300 and the scanning line 302 are the pixel scanning lines physically existed in the $2^{nd}$ field, and the interpolation line 304 is the pixel scanning line not physically existed in the $2^{nd}$ field. The pixel on the interpolation line 304 is generated by the interpolation algorithm according to the embodiment of the present invention.

A plurality of pixels neighboring to the edge 30 of a motion object is shown in FIG. 3, wherein 7 pixels, for example, respectively on the scanning lines 300 and 302 with pixel values of $P_{a-3}, P_{a-2}, P_{a-1}, P_a, P_{a+1}, P_{a+2}, P_{a+3}$ and $P_{b-3}, P_{b-2}, P_{b-1}, P_b, P_{b+1}, P_{b+2}, P_{b+3}$ are obtained, and R is the pixel value of the target pixel to be estimated on the scanning line 304 in the $2^{nd}$ field. First, a predetermined value of R is configured, that is to obtain the pixel values of two closet pixels on two neighboring scanning lines in the $1^{st}$ field, and an arithmetic mean of these two pixel values is obtained as the predetermined value of R, i.e. $R_{predetermined}=(P_a+P_b)/2$. Then, the difference value between the pixel value of each neighboring pixel and the $R_{predetermined}$ is calculated, and a set with minimum summation of difference values on the cross position is obtained by using the target pixel as a center, that is to obtain:

MIN  [$(|P_{a-3}-R|+|P_{b+3}-R|),(|P_{a-2}-R|+|P_{b+2}-R|)$,
$(|P_{a-1}-R|+|P_{b-1}-R|),(|P_a-R|+|P_b-R|),(|P_{a+1}-R|+|P_{b+1}-R|),(|P_{a+2}-R|+|P_{b-2}-R|),(|_{a+3}-R|+|P_{b-3}-R|)$]

Here, the arithmetic mean of the set $(P_{a+k}, P_{b-k})$ having the minimum value is obtained for the pixel value of the target pixel to replace the $R_{predetermined}$. Wherein, MIN [ ] represents the minimum value, and k=3, 2, 1, 0, −1, −2, −3.

In addition, the method for determining the R value in the still mode is also considered. If it is found that the positions of the edge 30 of the motion object are all varied in a small range (e.g. not greater than three pixels), it is determined in a still mode. Meanwhile, an arithmetic mean of the pixel value of the target pixel in the $1^{st}$ field and the pixel value of the same target pixel in the $2^{nd}$ field is obtained as the R value in the still mode.

FIG. 4 schematically shows a flow chart of detecting a video mode and determining a target pixel value comprised in a method for converting an interlaced image into a progressive image. Meanwhile, the reference field is the current field, and the auxiliary field is the previous field. The basic steps in the flow chart are as follows. First, the pixel of the object edge in image is found (402, 404). Then, it is determined whether or not the shift amount of the object edge between the reference field and the auxiliary field is greater than a reference value (408) Wherein, the reference value is for example three pixels as described in the preferred embodiment of the present invention. If it is greater than the reference value (421), the target pixel value of the auxiliary field is obtained by applying the interpolation algorithm described in the preferred embodiment of the present invention (410). If it is not greater than the reference value (417), the process is back to step 408 where a plurality of fields is repeatedly detected (419). If it is determined that the shift amount is not greater than the reference value even after detecting the plurality of fields (417), the auxiliary field is determined as a still image, and the target pixel value is replaced with the arithmetic mean of two target pixels of the reference field and the auxiliary field (412). Wherein, the reference field and the auxiliary field may be the $1^{st}$ field and the $2^{nd}$ field mentioned above, respectively. However, the order of the $1^{st}$ field and the $2^{nd}$ field is not necessarily limited by it. In other words, these two fields can be swapped with each other.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A video image conversion method for processing an interlaced field, wherein the interlaced field has a plurality of scanning lines, each of the scanning lines comprises a plurality of pixels represented as P(x,n), and the plurality of corresponding pixels is represented as Q(x,n), where x represents the $x^{th}$ scanning line, n represents the $n^{th}$ pixel on each of the scanning lines, and the video image conversion method comprises:

defining a target pixel, and the target pixel being located between the pixels P(x,n) and P(x+1,n) on two neighboring scanning lines;

obtaining a reference value R(x,n), wherein the reference value R(x,n) is an arithmetic mean of Q(x,n) and Q(x+1,n), where Q(x,n) and Q(x+1,n) are the pixel values of the pixel P(x,n) and the pixel P(x+1,n), respectively;

composing the pixel P(x,n−i) and the pixel P(x+1,n+i) of two neighboring scanning lines as a pair by using the target pixel as a center, and calculating a comparison value of each pair (abs[Q(x,n−i)−R(x,n)]+abs[Q(x+1,n+i)−R(x,n)]), where abs[i]=0, 1, 2, . . . , and abs[ ] represents obtaining an absolute value;

comparing each of the comparison values, and obtaining a pair of pixels P(x,n−j) and P(x+1,n+j) having a minimum value, where abs[j]=0, 1, 2, . . . ; and calculating an arithmetic mean of Q(x,n−j) and Q(x+1,n+j).

2. The video image conversion method of claim 1, wherein the pixel value of the target pixel is an arithmetic mean of Q(x,n−j) and Q(x+1,n+j).

3. The video image conversion method of claim 1, wherein the interlaced field is an odd field.

4. The video image conversion method of claim 1, wherein the interlaced field is an even field.

5. The video image conversion method of claim 1, further comprising:
   detecting and determining whether an object edge is existed in the vicinity of the target pixel in the interlaced field;
   repeatedly detecting a plurality of interlaced fields for determining whether a shift amount of the object edge is greater than a reference value; and
   if the shift amount is greater than the reference value, assigning an arithmetic mean of Q(x,n−j) and Q(x+1,n+j) as the pixel value of the target pixel.

6. The video image conversion method of claim 5, wherein the reference value is three pixels.

7. The video image conversion method of claim 5, further comprising:
   if the shift amount is not greater than the reference value, determining as a still mode; and
   in the still mode, obtaining an arithmetic mean of the pixel value corresponding to the position of the target pixel in the interlaced field and the value [Q(x,n−j) and Q(x+1,n+j)]/2 as the pixel value of the target pixel.

\* \* \* \* \*